(12) United States Patent
Bobier

(10) Patent No.: US 8,320,910 B2
(45) Date of Patent: *Nov. 27, 2012

(54) BAND MASKING OF SELF ORGANIZING CELLULAR NETWORKS

(75) Inventor: Joseph A. Bobier, Sunrise, FL (US)

(73) Assignee: XG Technology, Inc., Sarasota, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/226,710

(22) Filed: Sep. 7, 2011

(65) Prior Publication Data

US 2012/0071161 A1    Mar. 22, 2012

Related U.S. Application Data

(60) Provisional application No. 61/403,865, filed on Sep. 22, 2010.

(51) Int. Cl.
*H04W 4/00* (2009.01)

(52) U.S. Cl. ........ 455/434; 455/446; 455/450; 455/451; 455/452.1; 455/453; 370/310; 370/328; 370/329

(58) Field of Classification Search .............. 455/434, 455/446, 450, 451, 452.1, 453, 403; 370/310, 370/328, 329, 338
See application file for complete search history.

(56) References Cited

U.S. PATENT DOCUMENTS

| | | | | |
|---|---|---|---|---|
| 5,974,324 A | * | 10/1999 | Henson | 455/447 |
| 6,002,935 A | * | 12/1999 | Wang | 455/447 |
| 2003/0195016 A1 | * | 10/2003 | Periyalwar | 455/562.1 |
| 2005/0122999 A1 | | 6/2005 | Scherzer et al. | |
| 2005/0180351 A1 | | 8/2005 | Peric | |
| 2010/0296477 A1 | * | 11/2010 | Hason et al. | 370/330 |

* cited by examiner

*Primary Examiner* — Kathy Wang-Hurst
(74) *Attorney, Agent, or Firm* — Dennis L. Cook, Esq.

(57) ABSTRACT

This invention addresses a method of whereby a cellular base station can scan the radio band to identify radio channels that are not in use, then claim those un-used radio channels for use to transmit and receive radio signals. A plurality of such radio base station could then comprise a cellular radio network, which channel planning and frequency re-use has become autonomous and self organizing. The present disclosure aims to further expand the utility and function of such self organizing cellular networks by including a user interface to the base station by which the operator can define the radio spectrum boundaries that the base station is authorized to operate within and to further set operational rules for the use of sub-sections of that defined spectral boundary.

3 Claims, 2 Drawing Sheets

FIGURE 2

| BSN-300 #10245k | Low MHz | High MHz | DBm limit |
|---|---|---|---|
| Lower band limit (MHz) | 600 | | x |
| Upper band limit (MHz) | 928 | — | x |
| Off Limits (range in MHz) | 702 | 823 | x |
| Off Limits (range in MHz) | 830 | 850 | x |
| Off Limits (range in MHz) | | | x |
| Off Limits (range in MHz) | | | x |
| Listen before transmit | 600 | 650 | x |
| Listen before transmit | | | x |
| Limit power MHz / DBm | 902 | 928 | +30 |
| Limit power MHz / DBm | 600 | 650 | +28 |
| Use database | 600 | 702 | x |
| Use database | | | x |
| Database URL | http://xyznationldb.net | | |

BAND MASKING OF SELF ORGANIZING CELLULAR NETWORKS

CROSS-REFERENCE TO RELATED APPLICATION

The present application claims the benefit of previously filed Provisional Patent Application, Serial No. 61/403,865 filed Sep. 22, 2010.

FIELD OF THE INVENTION

This invention addresses a method whereby a cellular base station can scan the radio band to identify radio channels that are not in use, then claim those un-used radio channels for use to transmit and receive radio signals. A plurality of such radio base stations could then comprise a cellular radio network, which channel planning and frequency re-use has become autonomous and self organizing. The present disclosure aims to further expand the utility and function of such self organizing cellular networks.

BACKGROUND OF THE INVENTION

Cellular radio networks now proliferate much of the world. Constructing these networks requires the careful work of cellular network engineers. To construct a cellular network, one must consider many variables, not the least of which is the use and re-use of radio frequencies or channels. Cellular base stations make use of several radio channels, which are usually grouped and subdivided into sectors. For instance suppose that a cellular network has available to it 18 radio channels. Further suppose that the base station is expected to provide 360 degree radio coverage. Most cellular systems today transmit and receive in three sectors or directions. It follows then that each sector would have at least one antenna that is able to transmit and receive over a 120 degree arc to the horizon. At least one such antenna is directed to one sector of the coverage area and the antennas are arranged in a triangular pattern to affect full 360 degree coverage. Amongst these three antennas, the various radio channels are assigned so that each antenna has one or more distinct radio frequencies that won't interfere with the channels in use at the other two antennas. Thus a cellular base station typically incorporates three antenna systems, oriented 120 degrees apart, each with one or more unique radio frequencies or channels.

A cellular network then consists of many such cellular base stations. Cells which are adjacent to each other must be careful not to cause interference with each other. Interference is caused when antennas can receive or transmit radio frequencies that are used by other adjacent cells, causing radio interference. To avoid this overlap or duplication of frequencies by adjacent or nearby cells, radio network engineers use a variety of engineering practices, computer simulations and field testing. One technique used is known as frequency re-use planning, which in essence limits the number of frequencies used by any one base station to a subset of the total inventory of frequencies, thus assuring that adjacent cells always have frequencies available that aren't used by other adjacent cells. This practice limits the total number of frequencies, and thus the total radio bandwidth per cell, to some fraction of the available bandwidth. Strict adherence to such plans is often a part of the network design process, but imparts an added cost to the network because valuable radio channels aren't used when on many occasions they could be.

An ideal network always exists on paper, but never in practice. The first problem to be encountered is the location of the cell itself. While on a flat featureless plain, absent of cell placement restrictions, local zoning, and any of a myriad of legal and physical restrictions, a perfect location could be found for any cell location. Reality dictates that cells go where they can be put. This results in a less than uniform cellular placement. Thus, frequency re-use, transmitter power levels and antenna vertical tilt all become variables in the actual construction of the network on a cell by cell basis.

Once the cell is built, an engineering team must "drive test" the area to verify the cell coverage area. Once many cells are constructed, more drive testing must be done to evaluate the overall performance of the network and correct any un-desired interference.

BRIEF SUMMARY OF THE INVENTION

The invention disclosed in this application is an improvement to this lengthy process that will greatly simplify and speed network engineering, while saving much of the considerable cost of such engineering exercises. It is an improved cellular base station that is capable of "self organization" into a radio network so that much of the above outlined engineering effort is eliminated. Further the base station can be programmed to function over a wide range of radio spectrum while giving the operator a user interface that will define the usage of the radio spectrum so that portions of the incorporated spectrum are used differently, according to user defined rules.

By way of example, the BSN-250 base station and cellular network developed by xG Technology, Inc. consists of a digital controller, RF unit and three sector/combiner units. The digital controller provides external interface to the Internet, and radio air interface. The radio unit provides transmit RF amplifiers and receiver front-ends. The sector/combiner units divide the 18 radio channels into three sectors and combine 6 channels each into one antenna port for connection to a single sector antenna. Thus 18 radio channels are sub-divided into three sectors for use as described above.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawing, in which:

FIG. 2 is a table showing a HTML user interface.

DETAILED DESCRIPTION OF THE INVENTION

Figure 1:
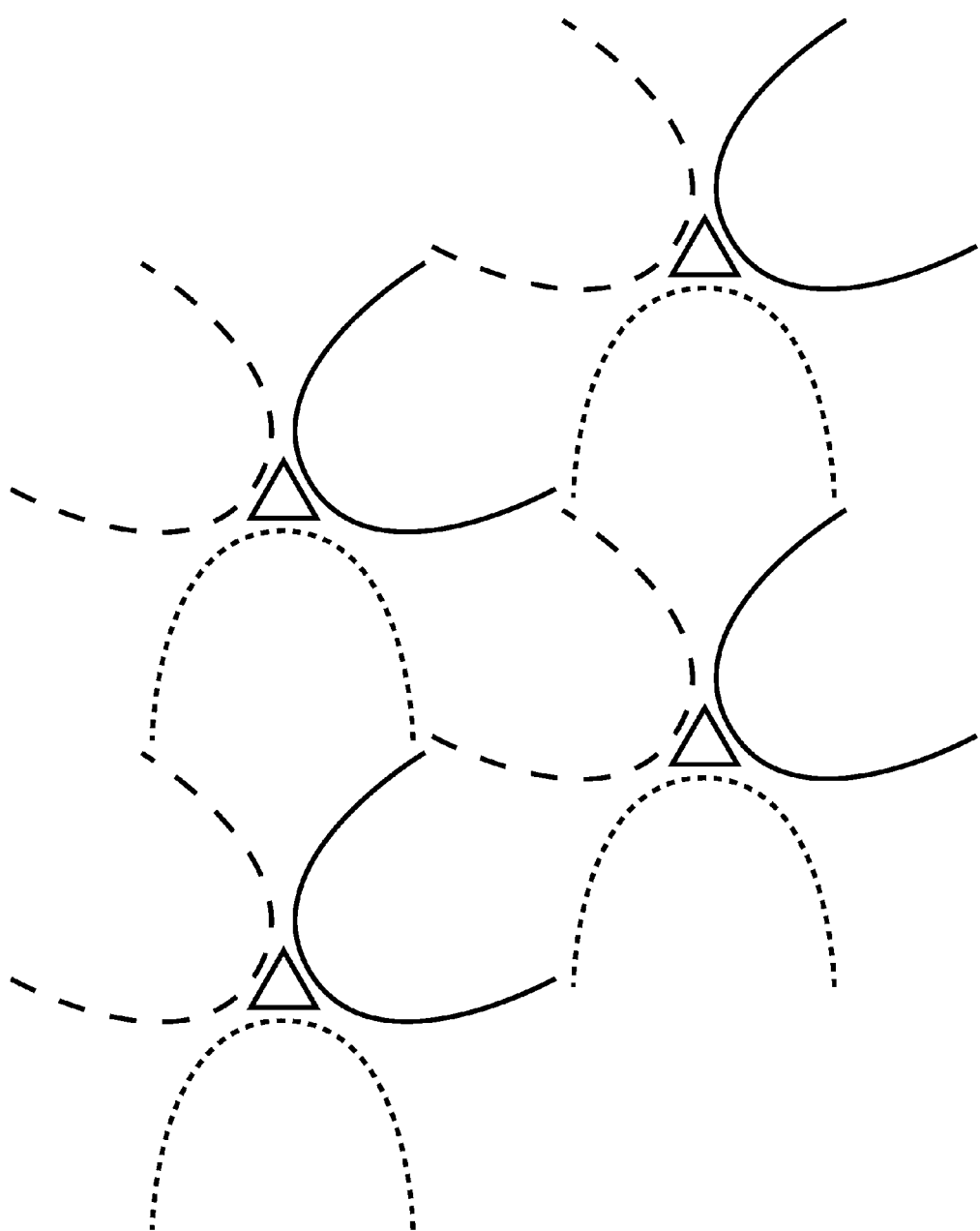
FIG. 1 is a diagram showing the three sector cellular configuration of a typical cellular network.

By way of example, the invention disclosed in this application is applied to a method of air interface design developed by xG Technology, Inc. and is now known by its commercial designation, xMax. The current architecture for a commercial xMax network is a cellular model. It's the familiar three sector, geodesic deployment in which each sector broadcasts signals to $\frac{1}{3}^{rd}$ of the 360 degree arc. Cells are positioned, ideally, so that sectors provide multiple re-enforcing signals from multiple directions to any given potential user location. Thus, channels are available to be received regardless of nearby shadowing.

In the xMax system, each sector can transmit and receive on 6 of up to 18 available channels. xMax is a TDMA system (Time Division Multiple Access). The channel allocation is pre-engineered for each sector. For instance solid line sectors might use channels 0,3,6,9,12 and 15 while the dashed sectors use channels 1,4,7,10,13 and 16 and dotted sectors use 2,5,8, 11,14 and 17 as shown in FIG. 1.

xG Technology's cellular networks are constructed much the same way as any other cellular network. An object of this invention is an improvement to the cellular base station.

While base stations for different services may have more or fewer channels than the BSN-250, the network engineering always follows the same basic process. Another object of this invention is to eliminate much of the network planning by giving the base station the ability to become self aware of other cell channels in use in the environment.

The process is as follows:
 a. The newly installed cell would be turned on.
 b. The cell would scan the assigned radio band on one sector, identifying the channel frequencies that are vacant.
 c. Up to six vacant channels would be identified and assigned to the first sector.
 d. The process repeats for each of the two remaining sectors.

Thus up to 18 channels have been scanned and verified as un-used and assigned across three sectors.

As convenient as it would be to have every base station fully self configuring to only use radio channels that can't be detected as in-use by other cells, there are situations where manual control might be important. For instance suppose one only needs a limited amount of radio network capacity near one cell, but more near another cell. Then a user interface would be available to disable the use of certain channels.

A further improvement would involve the incorporation of channel abandonment. As mentioned above, one doesn't always have access to the perfect location for cell placement. In some cases cells might be very close together. Some channels might not be available to a base station because they are in use by a nearby cell. To that end the user interface allows the engineer to further categorize a particular channel in one of three ways.
 i. Do not use
 ii. Share
 iii. Dominate When the channel is flagged as "Do not use", the channel is simply not used. When it's marked as "Share", the base station will scan and claim channels as described above. However the channel can be abandoned if heavy loading doesn't require the added capacity. A channel which is marked as "dominate" will not be abandoned, even if the base station doesn't need the capacity.

Base stations that are not experiencing heavy loading can unilaterally disable certain channels so that adjacent base stations that experience heavy loading can enable more channels. Any channel transceiver that is not assigned or used by a base station should remain in the scanning mode. If a channel suddenly becomes vacant, the base station should assume that there has been a voluntary abandonment of the channel and claim it to support the heavy load if one exists. Thus base stations would share overlapping channels to move capacity where it is needed. Also a channel can be automatically abandoned if interference is detected. Interference can be from other base stations, from other un-related systems, or even consumer devices. Being able to detect and avoid interference in favor of another less noisy channel is crucial for use in Unlicensed radio bands.

An improvement to the self organizing cellular base station described above that will create a further and expanded level of control by the system architect over the radio spectrum the base station is authorized to scan and claim will now be described.

A user interface to the base station is made available to the operator which can define the radio spectrum boundaries that the base station is authorized to operate within. Defining the authorized boundaries involves defining or setting several characteristics of the radio spectrum to be used. These could include but are not limited to:
 a. The upper and lower frequency extremes of the band to be utilized.
 b. Any portion or section of the now defined radio band that are considered "off limits."
 c. Special operational rules that might be specific to any particular sub-section of the overall radio band, for instance increased or reduced power levels, listen before transmit rules or legal requirements to use on-line data base geo-lookup tables prior to claiming a frequency.

The presentation of the user interface can take many forms. Perhaps the simplest would be a configuration form, likely presented by an HTML user interface in which the user will configure the operational rules by filling in the blanks of a form. An example might look like the table in FIG. 2.

Clearly the table of FIG. 2 is shown in limited scope for the purpose of demonstration. A variety of user interfaces are possible and this example demonstrates but one of many methods that would be obvious. More important than the interface itself is the capability that is imparted to the base station. By being able to control the spectral access of the base station through a user defined set of limits, masks and controls, the base station gains utility. In the case of the xG Technology, Inc. model BSN-250 or similar series, these devices are limited to the typical frequencies within the 902-928 MHz ISM band. Anticipating that new radio spectrum will be authorized by the governing bodies, primarily in the "TV white-space" bands, such added capability allows the base station to search out and utilize shared spectrum that is not being used by any other service or system at that moment. As rules change or additional spectrum becomes available, the base station operator would simply edit the operational rules through the user interface to allow operation by scanning and claiming new spectrum. Thus the utility of this invention is in the ability to expand and adjust the range of operation when the environment is a shared spectrum, allowing the base station to scan for and claim and use temporally vacant shared spectrum even if the availability of shared spectrum changes.

Since certain changes may be made in the above described system and method for band masking self organizing cellular networks without departing from the scope of the invention herein involved, it is intended that all matter contained in the description thereof or shown in the accompanying figures shall be interpreted as illustrative and not in a limiting sense.

What is claimed is:

1. A method for automatically organizing and setting operational rules for an interference avoiding radio frequency network of multiple base stations each capable of transmitting and receiving all channels of a radio frequency band and also having one or more sectors with each sector capable of transmitting and receiving multiple channels comprising:

first entering, through a user interface into one or more base stations of said multiple base stations, information regarding spectrum transmission boundaries defining or setting one or more characteristics of the radio spectrum and operational rules to be used by said one or more base stations;

then turning on one base station of said multiple base stations;

then said base station scanning all channels with one sector of said one or more sectors;

then said base station categorizing some or all of said channels as do not use, share, or dominate wherein the do not use categorized channels are disabled, the share categorized channels are scanned, identified, and assigned if available, and the dominate categorized channels are never disabled;

then said base station identifying all available channels in said one sector that are not being used by another base station of said multiple base stations;

then said base station assigning available unused channels to said sector of said base station wherein the maximum number of available unused channels to assign is determined by dividing the number of channels of a radio frequency band capable of being transmitted and received by said base station by the number of said one or more sectors on said base station; and, said base station then repeating the scanning, categorizing, identifying, and assigning of unused channels in each of the other sectors of said one or more sectors.

2. The method of claim 1 including disabling some or all unused channels.

3. The method of claim 2 including automatically disabling a channel if interference in said channel is detected by said base station.

* * * * *